United States Patent
Deshmukh et al.

(10) Patent No.: US 10,922,614 B2
(45) Date of Patent: Feb. 16, 2021

(54) CONVERTING PROCEDURAL TEXT TO AN ACTIONABLE KNOWLEDGE FORM

(71) Applicant: Tata Consultancy Services Limited, Maharashtra (IN)

(72) Inventors: Veena S. Deshmukh, Maharashtra (IN); Rahul Ramesh Kelkar, Maharashtra (IN); Mudit Dhagat, Maharashtra (IN); Sandeep Chougule, Maharashtra (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 702 days.

(21) Appl. No.: 14/541,492

(22) Filed: Nov. 14, 2014

(65) Prior Publication Data
US 2015/0142825 A1   May 21, 2015

(30) Foreign Application Priority Data
Oct. 15, 2013   (IN) .......................... 3242/MUM/2013

(51) Int. Cl.
*G06N 5/02* (2006.01)
*G06F 16/36* (2019.01)
(Continued)

(52) U.S. Cl.
CPC ........... *G06N 5/022* (2013.01); *G06F 16/313* (2019.01); *G06F 16/36* (2019.01); *G06F 40/211* (2020.01); *G06Q 10/10* (2013.01)

(58) Field of Classification Search
CPC . G06N 5/022; G06F 17/271; G06F 17/30616; G06F 17/30731; G06F 16/313; G06F 16/36; G06Q 10/10
(Continued)

(56) References Cited

U.S. PATENT DOCUMENTS 5,715,468 A * 2/1998 Budzinski ............... G06F 17/27
704/9
5,721,938 A * 2/1998 Stuckey ................ G06F 40/211
704/4
(Continued)

OTHER PUBLICATIONS

Little et al., "Translating Keyword Commands into Executable Code", 2006, ACM 1-59593-313-1/06/0010, pp. 135-144, 10 pages printed. (Year: 2006).*

*Primary Examiner* — Tony Mahmoudi
*Assistant Examiner* — Michael Le
(74) *Attorney, Agent, or Firm* — Thompson Hine LLP

(57) ABSTRACT

Disclosed is method and system for converting text used to perform an operation to reusable actionable knowledge form. Procedural knowledge available in run books is converted into reusable actionable knowledge form. The method comprises structuring the text by performing merging, grouping, editing, removing statements and marking statements present in structured text into action segments, predicates, and comments, by parsing technique and rule based reasoning. Predicate comprise conditions, action segment comprise actionable statements executed upon fulfilling conditions. Actionable statement is used to perform a task of the operation. Action segments are mapped with predicates to generate predicate-action pairs, standard operators relevant to each of conditions of predicate and actionable statements of action segment are selected, and score for standard operators is determined, and a standard operator having highest score is linked with conditions and actionable statements of the predicate-action pair, thereby converting predicate-action pair in reusable actionable knowledge form.

8 Claims, 10 Drawing Sheets

(51) Int. Cl.
*G06F 16/31* (2019.01)
*G06Q 10/10* (2012.01)
*G06F 40/211* (2020.01)

(58) Field of Classification Search
USPC .......................................................... 707/748
See application file for complete search history.

(56) References Cited

U.S. PATENT DOCUMENTS

| | | | | |
|---|---|---|---|---|
| 6,035,119 | A * | 3/2000 | Massena | G06F 8/30 717/100 |
| 8,112,710 | B2 | 2/2012 | Cheng et al. | |
| 8,533,608 | B1 | 9/2013 | Tantiprasut | |
| 8,756,301 | B2 * | 6/2014 | Ennis | H04L 41/00 709/223 |
| 2003/0046665 | A1 * | 3/2003 | Ilin | G06F 8/33 717/126 |
| 2003/0101152 | A1 * | 5/2003 | Hicks | G06F 8/30 706/45 |
| 2003/0163302 | A1 * | 8/2003 | Yin | G06N 5/025 704/9 |
| 2004/0102960 | A1 * | 5/2004 | Shimomura | G06F 17/2785 704/9 |
| 2004/0177159 | A1 * | 9/2004 | Butterfield | G06Q 10/10 709/246 |
| 2006/0095550 | A1 * | 5/2006 | Nemmaier | G06F 8/30 709/223 |
| 2008/0021701 | A1 * | 1/2008 | Bobick | G06F 40/284 704/9 |
| 2009/0172533 | A1 * | 7/2009 | Hamzaoui | G06F 9/453 715/704 |
| 2010/0145676 | A1 * | 6/2010 | Rogers | G06F 17/30905 704/9 |
| 2010/0191771 | A1 | 7/2010 | Jones | |
| 2011/0078286 | A1 * | 3/2011 | Nishino | H04N 1/00127 709/219 |
| 2011/0219015 | A1 * | 9/2011 | Kim | G06F 16/951 707/768 |
| 2012/0095951 | A1 * | 4/2012 | Ray | G06F 16/345 706/47 |
| 2013/0117204 | A1 * | 5/2013 | Vadlamani | G06N 5/022 706/12 |

* cited by examiner

| Import Document | Restructuring the document | Mark Actionable statements | Associate standard |
|---|---|---|---|

▶ P1

▶ P2

Step 1 Validate the agent is working
Check the SMS Agent Host service in Computer Management
i. Start the service (ccmexec.exe) and set the service to automatic

- If the service is not set to automatic, then change it
- If the service is started, proceed to step 2
- If the service is not started, attempt to start service
  - a. If restart is successful, proceed to step 2
  - b. If restart is not successful, proceed to Step 3

▶ P3

Step 2 Verify SCCM logs
Locate the SCCM logs –
C:\windows\ccm\logs on t machine running CM12 SP1 (version 5.00.7796.1000)
The ccmexec.log should have recent updates if things are working normally
If there is no update in ccmexec.log within the last 15 minutes, then the agent is not working properly
Then Proceed to step 3

▶ P4

Step 3 Rebuilding the WMI
We saved psexec.exe and fixwmi.cmd.in\.
\csrv10\tts\T\TCS\IS\ESM\SCCM Folder
Copy both of them in your system local path Merge statements Create New Paragraph Edit Remove

Figure 3

| Import Document | Restructuring the document | Mark actionable statements | Associate status |

- P1

SCCM troubleshooting Documents
Notes
The SCCM service shows as SMS Agent Host service in Computer Management(ccmexec.exe)
The SMS Agent Host service should be started and set to automatic on all windows servers

- P2

Step 1 Validate the agent is working
Check the SMS Agent Host service in Computer Management
i. Start the service (ccmexec.exe) and set the service to automatic
b. If restart is not successful, proceed to Step 3

- New paragraph.
  a. If restart is successful, proceed to step 2
  If the service is not set to automatic, then change it
  If the service is started, proceed to step 2
  If the service is not started, attempt to start service

- P3

Step 2 Verify SCCM logs
Locate the SCCM logs —
C:\windows\ccm\logs on t machine running CM12 SP1 (version 5.00.7796.1000)
The ccmexec.log should have recent updates if things are working normally

CONVERTING PROCEDURAL TEXT TO AN ACTIONABLE KNOWLEDGE FORM

CROSS-REFERENCE TO RELATED APPLICATIONS AND PRIORITY

The present application claims priority to Indian Provisional Patent Application No. 3242/MUM/2013, filed on Oct. 15, 2013, the entirety of which is hereby incorporated by reference.

TECHNICAL FIELD

The present disclosure described herein, in general, relates to knowledge acquisition from text and more particularly to capturing procedural text associated with procedural knowledge from a document and converting the text to an actionable knowledge form.

BACKGROUND

In today's Information Technology (IT) driven world, the focus is on increasing efficiency of infrastructure support services and cost optimization through automation of the infrastructure support services. In spite of having a large scope for automation and standardization managing support services remains a people intensive task due to lack of a superior knowledge repository. For automation of the support services, existing knowledge from operating procedures may be captured and stored in a knowledge repository. Major source of the existing knowledge may comprise run books, log books, service manuals, standard operating procedure documents, and the like. The standard operating procedure documents are commonly referred to as fixed logs or run books.

In a computer system or network, a run book is a written set of procedures for the routine and exceptional operation of the system or network by an administrator or operator. Typically, a run book contains procedures for performing service operations associated with different elements of data center system. For example, mounting of a storage device containing archived material and handling problems associated with the data center. The run book may further comprise set-up or configuration details, operational commands, compatibility checks to be performed, screenshots and the like. A run book is a corporate memory and represents mature and validated knowledge about common IT infrastructure support services and problems resolution. Different organizations may have different structure and format followed to create the run books. Even within an organization, different sections may follow different structure and format while writing the run books. In matured organizations, a large volume of run books are available in inconsistent formats.

Conventionally domain experts study the run books and manually write executable or semi executable scripts for the run books. However, considering a volume of the run books in an organization and low availability of the domain experts, manual transformation of procedural knowledge from the run books into executable forms is extremely tedious and impractical. Further, in manually transformed executable knowledge, there is limited potential for reuse of the executable knowledge. Due to diverse styles of writing by the runbook authors, the run books are not in standard format. Run books containing grammatical errors, code scripts, and domain jargons may create difficulty in using a standard parser to extract knowledge. In general, run books or procedure documents are natural language artifacts and hence are not correlated to a set of executable actions. As a result, today attempts are majorly focused on automation of run books by manually coding the scripts. Since natural language from the run books is deciphered with difficulty by computers, there still exists a challenge to automatically create actionable knowledge or computer executable run books without human intervention with reuse potential.

SUMMARY

This summary is provided to introduce aspects related to systems and methods for converting text contained in a document to an actionable knowledge form and the aspects are further described below in the detailed description. This summary is not intended to identify essential features of the claimed disclosure nor is it intended for use in determining or limiting the scope of the claimed disclosure.

In one implementation, a method for converting text contained in a document to an actionable knowledge form is disclosed. The text is used to perform an operation. The operation is a service operation equivalent to a high level function. The method comprises structuring, by a processor, the text, by performing at least one of merging, grouping, editing, or removing statements present in the text to generate structured text. The method further comprises marking, by the processor, one or more statements present in the structured text into one or more categories. The one or more categories comprise an action segment, a predicate, and a comment. The predicate comprises one or more conditions. The action segment comprises one or more actionable statements executed upon fulfilling the one or more conditions. The one or more actionable statements are used to perform one or more tasks during execution of the operation. The method further comprises mapping, by the processor, the action segment with the predicate to generate a predicate-action pair. The method further comprises selecting, by the processor, one or more standard operators relevant to each of the one or more conditions of the predicate and each of the one or more actionable statements of the action segment, of the predicate-action pair. The one or more standard operators are atomic functions or lowest level functions. The method further comprises determining, by the processor, a score for the one or more standard operators relevant to each of the one or more conditions of the predicate and each of the one or more actionable statements of the action segment, of the predicate-action pair. The method further comprises linking, by the processor, a standard operator having a highest score with at least one of the one or more conditions of the predicate and the one or more actionable statements of the action segment, of the predicate-action pair, thereby the method comprises converting the predicate-action pair in an actionable knowledge form.

In one implementation, a system for converting text contained in a document to an actionable knowledge form is disclosed. The text is used to perform an operation. The system comprises a processor; and a memory coupled to the processor. The processor is capable of executing a plurality of modules stored in the memory. The plurality of modules comprises a structuring module, a mapping module and a selecting module. The structuring module structures the text by performing at least one of merging, grouping, editing, or removing statements present in the text to generate structured text. The structuring module marks one or more statements present in the structured text into one or more categories. The one or more categories comprise an action segment, a predicate, and a comment. The predicate comprises one or more conditions. The action segment comprises one or more actionable statements executed upon fulfilling the one or more conditions. The one or more actionable statements are used to perform one or more tasks during execution of the operation. The mapping module maps the action segment with the predicate to generate a predicate-action pair. The selecting module selects one or more standard operators relevant to each of the one or more conditions of the predicate and each of the one or more actionable statements of the action segment, of the predicate-action pair. The selecting module further determines a score for the one or more standard operators relevant to each of the one or more conditions of the predicate and each of the one or more actionable statements of the action segment, of the predicate-action pair. The selecting module further links a standard operator having a highest score with at least one of the one or more conditions of the predicate and the one or more actionable statements of the action segment, of the predicate-action pair, thereby converting the predicate-action pair in an actionable knowledge form.

In one implementation, a computer program product having embodied thereon a computer program for converting text contained in a document to an actionable knowledge form is disclosed. The text is used to perform an operation. The computer program product comprises a program code for structuring the text by performing at least one of merging, grouping, editing, or removing statements present in the text to generate structured text. The computer program product further comprises a program code for marking one or more statements present in the structured text into one or more categories. The one or more categories comprise an action segment, a predicate, and a comment. The predicate comprises one or more conditions. The action segment comprises one or more actionable statements executed upon fulfilling the one or more conditions. The one or more actionable statements are used to perform one or more tasks during execution of the operation. The computer program product further comprises a program code for mapping the action segment with the predicate to generate a predicate-action pair. The computer program product further comprises a program code for selecting one or more standard operators relevant to each of the one or more conditions of the predicate and each of the one or more actionable statements of the action segment, of the predicate-action pair. The computer program product further comprises a program code for determining a score for the one or more standard operators relevant to each of the one or more conditions of the predicate and each of the one or more actionable statements of the action segment, of the predicate-action pair. The computer program product further comprises a program code for linking a standard operator having a highest score with at least one of the one or more conditions of the predicate and the one or more actionable statements of the action segment, of the predicate-action pair, thereby converting the predicate-action pair in an actionable knowledge form.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

FIG. 3 illustrates structuring of the text contained in the document, in accordance with an embodiment of the present disclosure.

FIG. 4 illustrates structuring of the text particularly by merging of highlighted text to add new paragraph, in accordance with an exemplary embodiment of the present disclosure.

DETAILED DESCRIPTION

Systems and methods for converting text contained in a document to an actionable knowledge form are described. The text may be used to perform an operation. Particularly, procedural knowledge available in the text of the document such as a run book, an operating procedure document, a service document, and a service manual may be converted into an actionable knowledge form and may be stored in a knowledge repository. The text may be procedural text. In order to convert the text to an actionable knowledge form, at first, the text may be structured to generate structured text. The generated structured text may contain one or more statements which may be marked into one or more categories.

The one or more categories may comprise action segments, predicates, and comments. A predicate may comprise one or more conditions. An action segment may comprise one or more actionable statements executed upon fulfilling the one or more conditions. The one or more actionable statements may be used to perform one or more tasks during execution of the operation. Subsequent to marking the one or more statements into the one or more categories, the action segments may be mapped with predicates to generate predicate-action pairs. Post generating the predicate-action pairs, one or more standard operators relevant to each of the one or more conditions of the predicate and each of the one or more actionable statements of the action segment, of a predicate-action pair may be selected. Each standard operator of the one or more standard operator may be assigned a score. Post assigning the score, a standard operator having a highest score may be linked with each of the one or more conditions of the predicate and each of the one or more actionable statements of the action segment, of the predicate-action pair. This predicate-action pair may be in an actionable knowledge form.

While aspects of described system and method for converting text contained in a document to an actionable knowledge form may be implemented in any number of different computing systems, environments, and/or configurations, the embodiments are described in the context of the following exemplary system.

Figure 1:
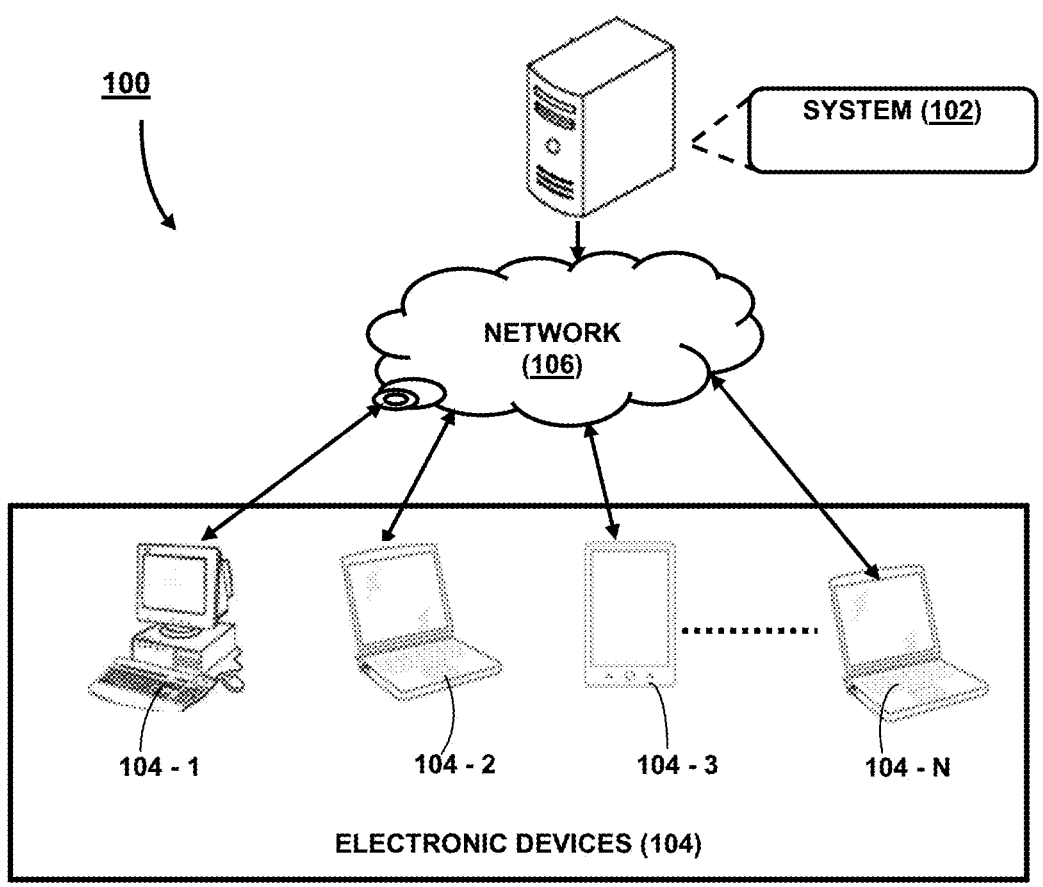
FIG. 1 illustrates a network implementation of a system for converting text contained in a document to an actionable knowledge form, in accordance with an embodiment of the present disclosure.

Referring now to FIG. 1, a network implementation 100 of a system 102 for converting text contained in a document to an actionable knowledge form is illustrated, in accordance with an embodiment of the present disclosure. Particularly, procedural knowledge available in the text of the document such as a run book, an operating procedure document, a service document, and a service manual may be converted into an actionable knowledge form and may be stored in a knowledge repository. The text may be procedural text. In one embodiment, the system 102 provides structuring of the text by performing at least one of merging, grouping, editing, or removing statements present in the text to generate structured text. Post structuring the text, the system 102 marks one or more statements present in the structured text into one or more categories. The system 102 provides an effective and efficient mechanism for marking the one or more statements into the one or more categories by using parsing technique and rule based reasoning. The one or more categories may comprise action segments, predicates, and comments. A predicate may comprise one or more conditions. An action segment may comprise one or more actionable statements executed upon fulfilling the one or more conditions. The one or more actionable statements may be used to perform one or more tasks during execution of the operation. The system 102 further maps action segments with predicates to generate predicate-action pairs. The system 102 selects one or more standard operators relevant to each of the one or more conditions of the predicate and each of the one or more actionable statements of the action segment, of a predicate-action pair of the predicate-action pairs. Post selecting the one or more standard operators, the system 102 determines a score for the one or more standard operators relevant to each of the one or more conditions of the predicate and each of the one or more actionable statements of the action segment, of the predicate-action pair. Subsequent to determining the score, the system 102 links a standard operator having a highest score with at least one of the one or more conditions of the predicate and the one or more actionable statements of the action segment, of the predicate-action pair. The predicate-action pair is in actionable knowledge form.

The text document may be visualized as a high level function e.g. Mount storage device. The text document may be visualized as composed of one or more one or more predicate-action pairs. Each predicate and action segment may be mapped to atomic functions or standard operators. A standard operator is actionable unit and typically mapped to an individual computer executable command. In case of predicate, each condition may be mapped to a return or an output value of a standard operator (typically one executed earlier) and in case of action segment each action statement maps to a standard operator directly. One or more high level functions of the text document and the atomic functions or the standard operators are potential reusable actionable knowledge blocks.

Although the present disclosure is explained considering that the system 102 is implemented on a server, it may be understood that the system 102 may also be implemented in a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
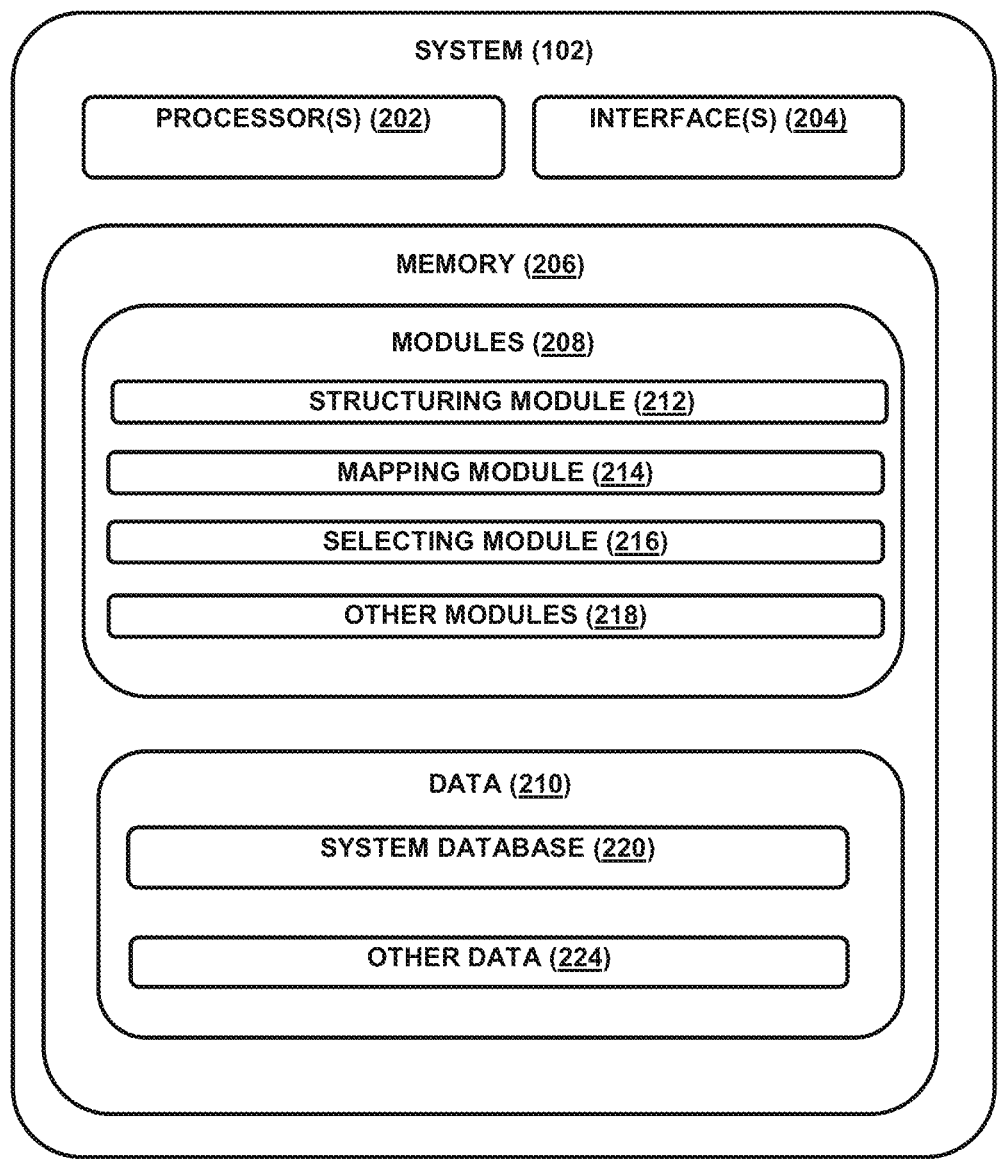
FIG. 2 illustrates the system of FIG. 1 for converting the text contained in the document to an actionable knowledge form, in accordance with an embodiment of the present disclosure.

Referring now to FIG. 2, the system 102 is illustrated in accordance with an embodiment of the present disclosure. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, programmed instructions and the like, which perform particular tasks, functions or implement particular abstract data types. In one implementation, the modules 208 may include a structuring module 212, a mapping module 214, a selecting module 216, and other modules 218. The other modules 218 may include programs or coded instructions that supplement applications and functions of the system 102.

The data 210, amongst other things, serves as a repository for storing data processed, received, and generated by one or more of the modules 208. The data 210 may also include a system database 220, and other data 224. The other data 224 may include data generated as a result of the execution of one or more modules in the other module 218.

In one implementation, at first, a user may use the client device 104 to access the system 102 via the I/O interface 204. The user may register using the I/O interface 204 in order to use the system 102. The working of the system 102 may be explained in detail in FIGS. 3 to 8 explained below. The system 102 may be used for converting text contained in a document to an actionable knowledge form. The document may be one of an operating procedure document, a service document, a run book, and a service manual. Run book is a routine compilation of procedures and operations, typically created by top tier managed service providers. Run books include procedures for every anticipated scenario and use step-by-step procedures to determine effective course of action given a particular scenario (issue). Administrator or operator of support system carries out run book procedures while resolving an issue (ticket). Conventionally, domain experts study the run book and may manually create an executable or semi executable (e.g. shell script/flowchart) using the run book.

The document may comprise routine compilation of procedures and operations. The procedures and the operations may be used or applied to resolve an issue or provide a service in the information technology (IT) support services. The document may be in a text form. By way of an example, the document may be a Microsoft Word™ file (DOC), a PDF file, a Hyper Text Markup Language (HTML) file, Extensible Markup Language (XML) file and the like. The documents may be in any text form known to a person skilled in the art.

The document may comprise the text. The text may be procedural text. The text may comprise procedural knowledge to perform an operation. Hence, the text may be used to perform the operation. The texts may comprise an ordered list of actionable statements to reach a goal. The text may also comprise arguments, advices, conditions, hypothesis, preferences, recommendations, warnings, and comments of various sorts. In order to convert the text to reusable actionable knowledge form, the system 102, at first, structures the text. Specifically, in the present implementation, the text is structured by the structuring module 212.

Structuring Module 212

Referring to FIG. 2, a detailed working of the structuring module 212 along with the working of other components of the system 102 is illustrated, in accordance with an embodiment of the present disclosure. In one implementation, at first, the structuring module 212 may structure the text to generate structured text.

In one implementation, the structuring module 212 may structure the text by segmenting the text into independent textual blocks. Further, the structuring module 212 may segment the textual blocks into statements by using a boundary detection technique. Subsequent to segmenting the textual blocks into the statements, the structuring module 212 may structure the text by performing at least one of merging, grouping, editing, or removing the statements present in the text to generate the structured text.

Figure 5:
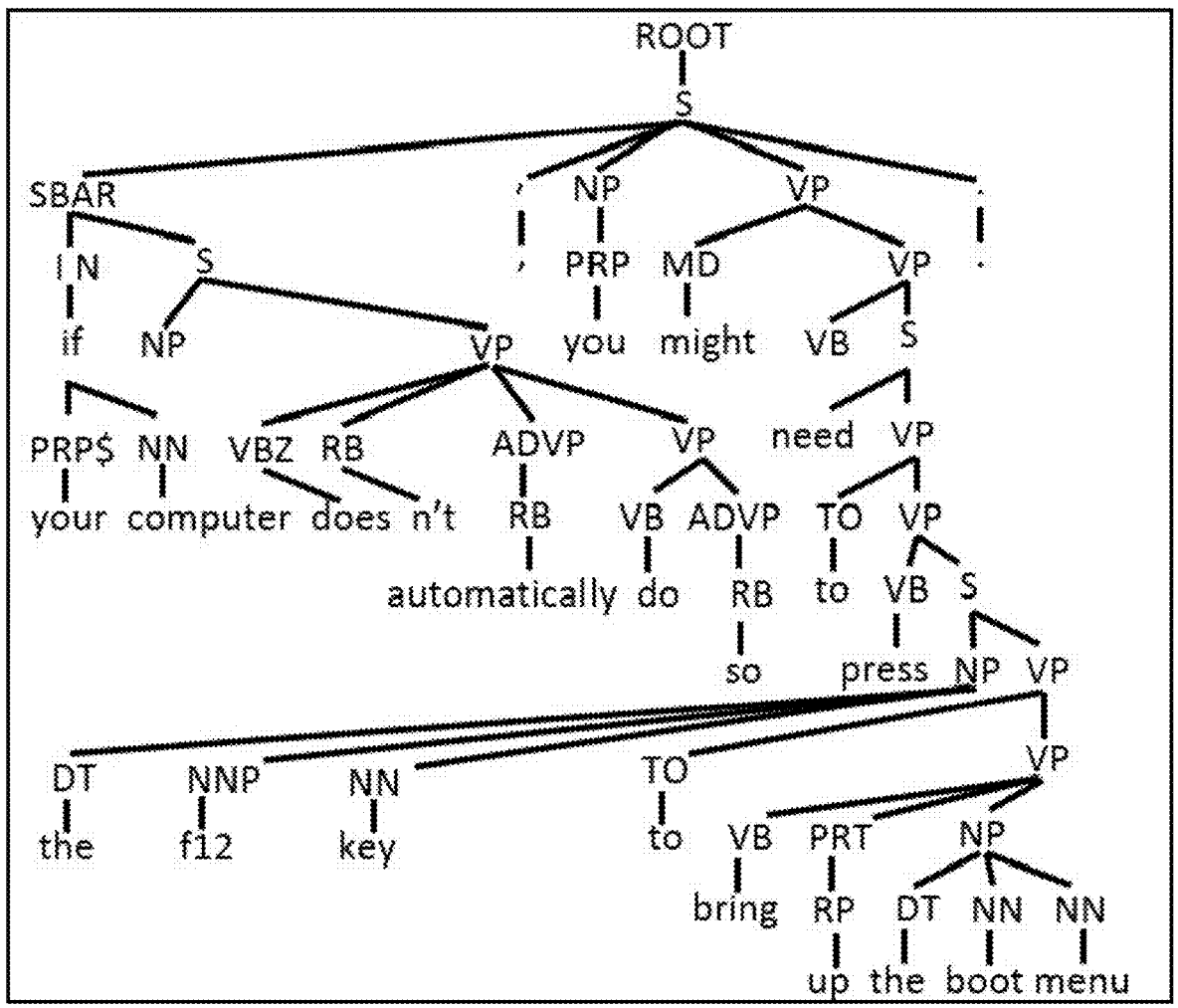
FIG. 5 illustrates a parse tree generated by Stanford Parser™ based on input text, in accordance with an exemplary embodiment of the present disclosure.

It may be understood that in one embodiment, after segmenting the text into the textual blocks (paragraphs) and segmenting the textual blocks into the statements, the text may be displayed in the textual blocks (paragraphs) and the statements. Referring now to FIGS. 3 to 5, structuring of the text contained in the document is illustrated, in accordance with an exemplary embodiment. FIG. 3 depicts that the text is segmented into the textual blocks (paragraphs-P1, P2, P3 and P4) and further the textual blocks may be segmented into the statements. FIG. 4 illustrates structuring of the text by merging of highlighted text to add new paragraph, in accordance with an exemplary embodiment of the present disclosure. Further, as shown in FIGS. 3 and 4, highlighted text is merged and further grouped and added as a new paragraph by the structuring module 212.

According to an exemplary embodiment, the boundary detection technique may comprise, at first, using a regular expression to identify occurrence of a period as occurrence of a full stop, to segment the textual blocks into statements. By way of an example, the regular expression may be used for extracting sentence from a paragraph in python. The identification of occurrence of the period may comprise skipping occurrences of the period from abbreviated forms. This means consideration of occurrence of a full stop after abbreviated forms may be skipped. After identifying occurrences of the period, a standard Stanford Parser™ may be applied on each statement along with a segmenting option to generate a parse tree.

Another example for taking precaution of file extension's while finding the occurrence of the period is described. For example, while using SMS Agent Host service in ccmexec.exe, a sentence is not split on the '.'. When '.' is a file extension, '.' is replaced with "_" and then Stanford's Parser™ is used for splitting the text into sentences. Further the changes are reverted back by replacing '_' back with '.' for file extensions.

Post generating the structured text, the structuring module 212 may mark one or more statements present in the structured text into one or more categories. The one or more categories may comprise action segments, predicates, and comments. A predicate may comprise one or more conditions. An action segment may comprise one or more actionable statements. The one or more actionable statements may be executed upon fulfilling the one or more conditions.

The one or more actionable statements may be used to perform one or more tasks during execution of the operation. In one implementation, the structuring module 212 may mark the one or more statements into the one or more categories by using a parsing technique and a rule based reasoning. Referring to FIG. 5, the parsing technique is illustrated in accordance with an exemplary embodiment. The application of the parsing technique comprises applying a standard Stanford Parser™ on the one or more statements to annotate each word with a part of speech (POS) tag to generate a parse tree. Generation of parse tree is an inbuilt functionality provided by Stanford Parser™.

According to an exemplary embodiment of the present disclosure, parsing of the one or more statements using a Stanford Parser™ is explained. FIG. 5 depicts a parse tree generated by the Stanford Parser™ based on an input text. Referring to FIG. 5, a statement (S) may be divided into branches of compositional segments. Each compositional segment may further be divided into lower level grammatical segments. A plurality of verb phrases (VP) may be extracted from the statement (S) as expressions of core activities from first level branch of the parse tree. Further each verb phrase may have associated contextual information. For example, FIG. 5 depicts a parse tree generated by parsing of a statement (S) as "If your computer doesn't automatically do so, you might need to press the F12 key to bring up the boot menu" by the Stanford Parser™. The SBAR tag is associated with "If your computer doesn't automatically do so" segment as associated contextual information. Further, plurality of grammatical segments that may serve as VP context may include prepositional phrases (PP), adverb phrases (ADVP), simple declarative clauses (S), and noun phrases (NP).

According to an exemplary embodiment, using the parse tree and applying one or more rules on the parse tree the one or more statements may be marked into one or more action segments, one or more predicates, and one or more comments as described below. The one or more rules may be applied on the parse tree by using the rule based reasoning. In one exemplary embodiment, a rule for marking the action segment is described. To illustrate the rule based reasoning technique, and particularly the rule for marking the action segment, following example may be considered. The action segment may comprise one or more actionable statements. By way of an example, if the statement starts with "VB" (verb, base form) tag, then a sibling declarative clause 'S' is located in the parse tree and the sibling declarative clause 'S' is marked as an actionable statement. If "VB" tag is preceded by ADJ (adjective), ADVP (adverb phrase) or any statement delimiter, then sibling declarative clause 'S' is located and the sibling declarative clause 'S' is marked as the actionable statement. By way of an example, tags used in the present disclosure are selected from Penn Treebank™ Tag set.

According to an exemplary embodiment, another rule for marking of a predicate using the rule based reasoning is described. The predicate may comprise one or more conditions. Hence to mark the predicate, one or more conditions may be marked in a statement. Together the one or more conditions of the statement may be called as the predicate. To illustrate the rule based reasoning technique, particularly in marking of the predicate, following example may be considered. SBAR (subordinating conjunction) tag may be located to extract context information. If SBAR parse tree has "IN" (conjunction, subordinating or preposition) or "WRB" (Wh-adverb) as first node, then sibling declarative clause node is marked as a condition. For example, if input to the structuring module 212 is a statement—"If your computer doesn't automatically do so, you might need to press the F12 key to bring up the boot menu." Output of the structuring module 212 is the structured text with marking of actionable statements and conditions. The output is "<condition> If your computer doesn't automatically do so </condition>, you might need to <Actionable statement> press the F12 key to bring up the boot menu. </Actionable statement >"

Figure 6:
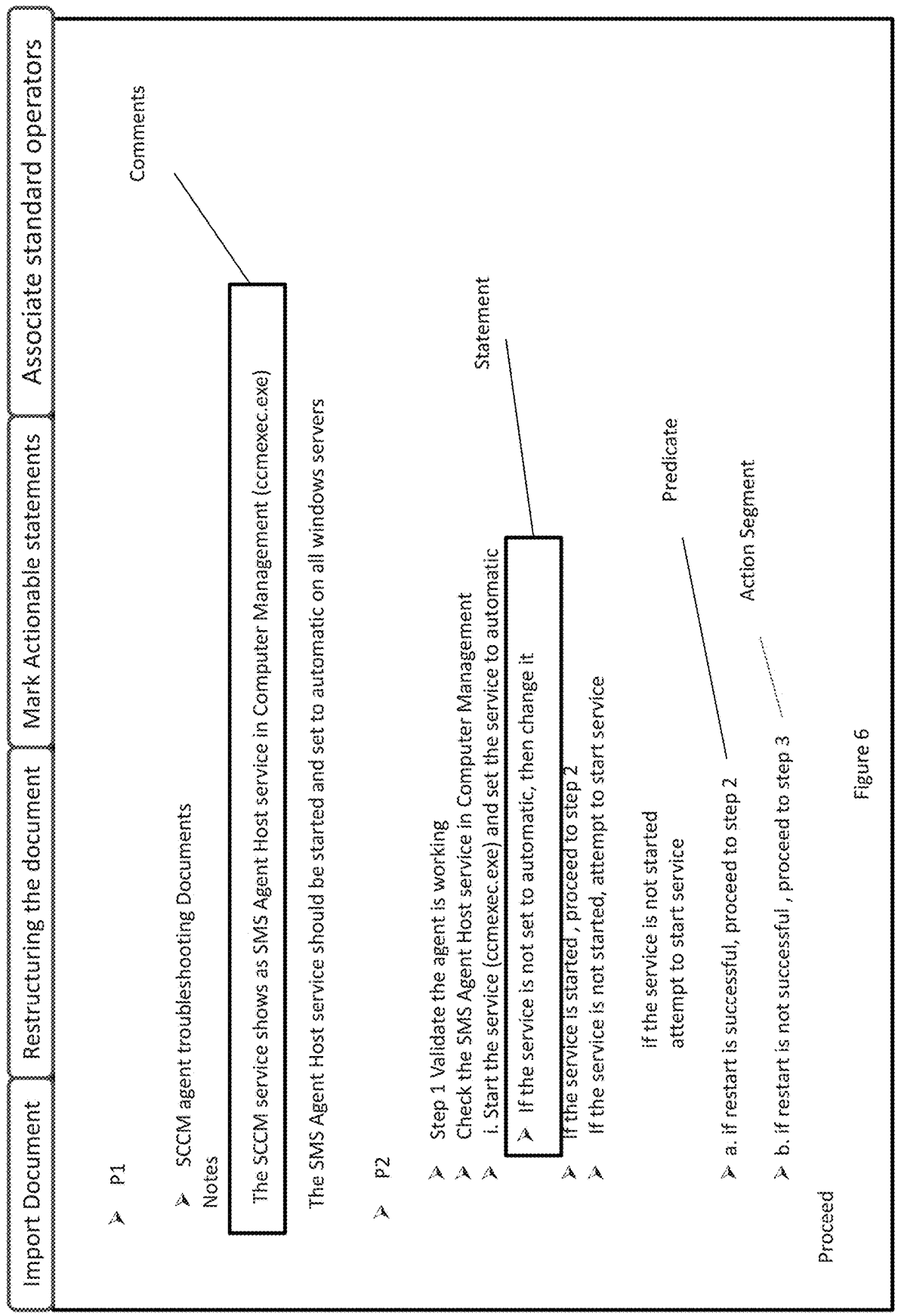
FIG. 6 illustrates marking of the structured text into one or more categories, in accordance with an exemplary embodiment of the present disclosure.

FIG. 6 illustrates marking of the structured text into the one or more categories, in accordance with an exemplary embodiment of the present disclosure. In one example, FIG. 6 illustrates marking of the structured text into the action segments, the predicates, and the comments. The statement "if the service is not started, then attempt to start the service" is marked as an applicable statement. The part of the statement "if the service is not started" is marked as a predicate (condition) and another part of the statement "attempt to start service" is marked as an action segment (actionable statement). If the statement is without any predicate or action segment part, then the statement is not considered to be valid for the applicable statement. Such statements are marked as the comments by the structuring module 212.

Referring to FIG. 4, structuring module may remove junk statements, not useful sentences, and jargons from the text and may construct the text into more significant and meaningful text, herein termed as the structured text. After marking the predicates, the action segments, remaining text of the text may be marked as junk statements, not useful sentences, and jargons. The junk statements, not useful sentences, and jargons may be removed from the text by the structuring module 212.

Mapping Module 214

In one implementation, subsequent to marking of the one or more statements present in the structured text into one or more categories, the mapping module 214 may map the action segments with the predicates to generate predicate-action pairs. A predicate-action pair may be generated by mapping one or more predicates with an action segment. The predicate may comprise one or more conditions, and the action segment may comprise one or more actionable statements. The predicate-action pair may be generated in such a way that the action segment is executed upon fulfilling the one or more conditions present in the predicate. In other words, the predicate-action pair may be generated in such a way that the one or more actionable statements present in the action segment may be executed upon fulfilling the one or more conditions present in the predicate. The one or more actionable statements may be used to perform one or more tasks during execution of the operation.

For example, to create an actionable knowledge form for a service operation movefile (srcfile, destfile) on Linux platform, to move a file from a source to a destination along with 'checksum' check for verifying data integrity. A standard operator chksum(filepath) is used for returning a checksum on a document at specified 'filepath' location. The actionable knowledge movefile may be as shown below in Table 1.

TABLE 1

Example of a predicate-action pair

| No | Predicate | Action Segment |
|---|---|---|
| 1 | Srcfile, destfile exist | {(RetSrc, OutSrc)=chksum(srcfile)} |
| 2 | RetSrc = 0 | {move(srcfile,destfile), (RetDest,OutDest)=chksum(destfile)} |
| 3 | RetDest=0 && OutSrc=OutDest | {(Log "Succeed")(Resolved)} |

Here in Table 1, in No 3 row, though the OutSrc and OutDest are output variables for the same standard operator the instances are distinct, one is with srcfile parameter and another is with destfile parameter.

In one example, if a statement of the one or more statements contains only action segment without containing any predicate, then the action segment may be attached to the action segment of a previous statement. Further, if there are many consecutive statements containing only action segments, then all the action segments may be clubbed together as a single action segment and this clubbed action segment may be paired with an immediate predicate occurred previously, to form one predicate-action pair.

Selecting Module 216

In one implementation, subsequent to generating the predicate-action pairs, the selecting module 216 may select one or more standard operators relevant to each of the one or more conditions of the predicate and each of the one or more actionable statements of the action segment, of a predicate-action pair of the predicate-action pairs. A standard operator may be executed to perform one or more actionable statements associated with one or more tasks of the operation. The standard operator may be a predefined computer executable unit. A large set of standard operators may be available for performing various technical services, issues associated with software services and the like.

Each condition of the predicate may be mapped to at least one standard operator. Each actionable statement of the action segment may be mapped to at least one standard operator. For example, 'If (x) and (y) then do (a) and do (b)' is a statement. Then for this statement, standard operator associated with each of (x), (y), (a), and (b) may be selected.

In another embodiment, if the predicate is occurred in more than one predicate-action pairs, then the predicates are merged into a single predicate called as 'merged predicate'. There may be multiple decision paths for the merged predicate. The decision for next action (that is execution of next standard operator) may be taken based on a return value or an output generated from a standard operator within the merged predicate.

In one embodiment, the predicate may work as a decision point. In order to work the predicate as the decision point, a return and output variables may be implemented for standard operators. In application of a return method, the predicate itself may be expressed in form of a condition based on return or output value of selected standard operator. For example, consider following statement in a text document. 'If the service is not started, start it.' The predicate in this statement is, if the return value of standard operator 'service status' is false, then execute standard operator 'start service'. Herein the standard operator 'service status' is used for condition of the predicate and standard operator 'start service' is used for actionable statement of the action segment.

By way of an example, the one or more standard operators are provided in Table 2 and Table 3.

TABLE 2

Example of a standard operator

| Standard Operator Name | ServiceStatus |
|---|---|
| Action | ssh ${ServiceStatus:Hostname} service ${ServiceStatus:ServiceName} status |
| Parameters: | |
| Hostname | 10.0.3.152 |
| ServiceName | cups |
| ServiceStatus:Return | 0 |
| ServiceStatus:Output | cupsd (pid 12155) is running . . . |
| ServiceStatus:Return | 3 |
| ServiceStatus:Output | cupsd is stopped |
| ServiceStatus:Return | 1 |
| ServiceStatus:Output | cups: unrecognized service |

TABLE 3

Example of a standard operator

| Standard Operator Name | GetFileSizeInKB |
|---|---|
| Action | ssh ${GetFileSizeInKB:Hostname}du -sk ${GetFileSizeInKB:FileDirName}|awk '{print $1}'| tr -d '\n' |
| Parameters: | |
| Hostname | 10.0.3.152 |
| FilDirName | /etc |
| GetFileSizeInKB:Return | 0 |
| GetFileSizeInKB:Output | 149800 |

The selecting module 216 in order to select the one or more standard operators, at first, may locate one or more keywords of the one or more conditions of the predicate and one or more actionable statements of the action segment, by parsing the one or more conditions and by parsing the one or more actionable statements. Post locating the one or more keywords of the one or more conditions and the one or more actionable statements, the selecting module 216 may match the one or more keywords with key markers of standard operators. Based on matching of the key markers of the standard operators with the one or more keywords, the selecting module 216 may select one or more standard operators of the standard operators. For example, the selecting module 216 may use fuzzy technique to match the one or more keywords with the key markers of the standard operators.

For example, the one or more keywords of the one or more conditions and the one or more actionable statements may include subset of a universal set of key markers of the standard operators. The key markers of the standard operators may include Start, Service, Check, DB, Switch, Node, Host, port, telnet, VLAN, file, data, role, user, create and the like. The universal set of the keywords may be created by performing set union operation on the key markers of standard operations. The universal set of keywords may be a list of all the key markers from all the standard operators available in the knowledge repository. The action segment may be divided into distinct words to generate a set of words. Then intersection may be performed on the set of words with the universal key markers to get keywords from the one or more conditions and the one or more actionable statements.

Figure 7:
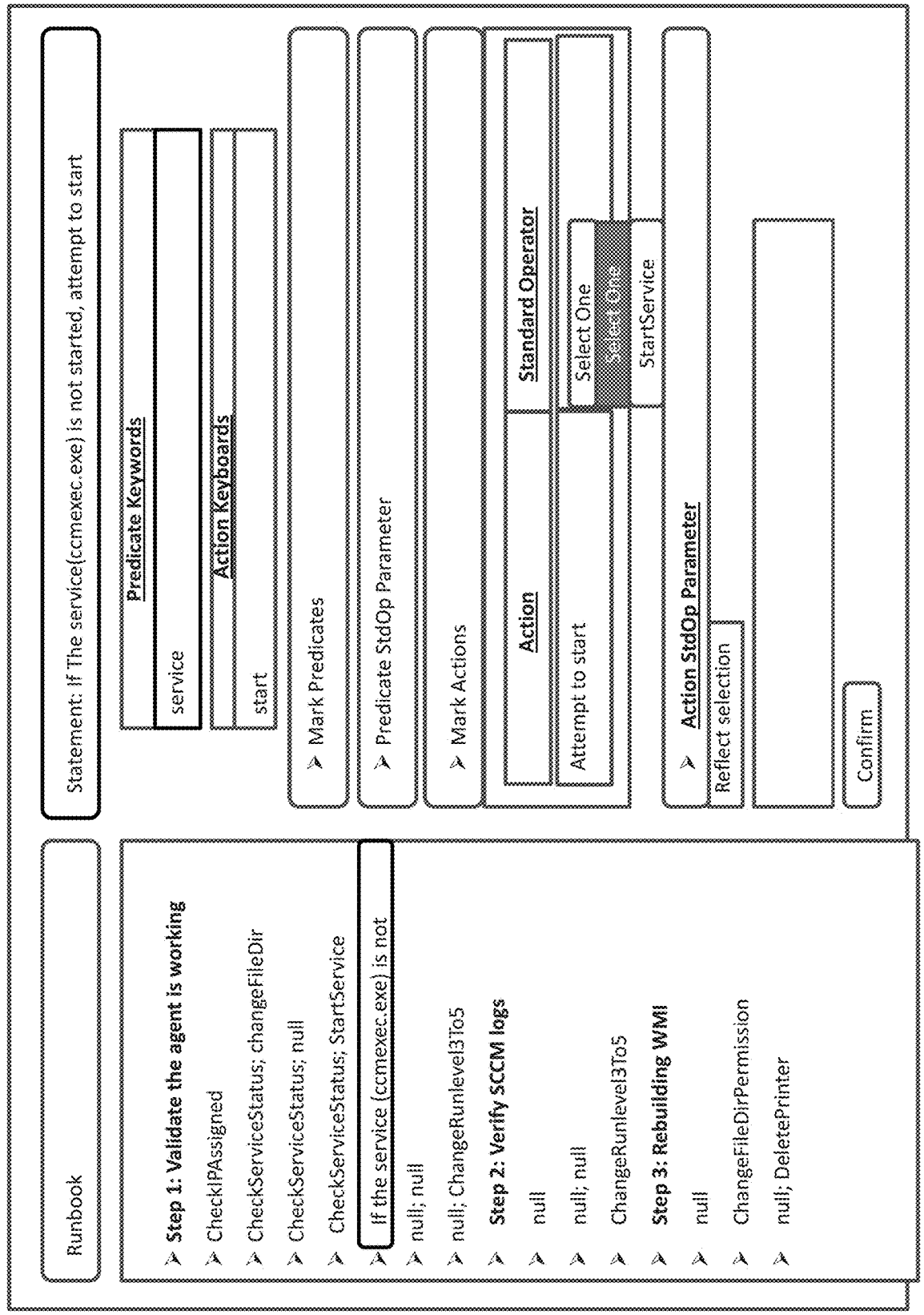
FIG. 7 illustrates selection and display of one or more standard operators relevant to one or more conditions of the predicate and one or more actionable statements of the action segment, in accordance with an exemplary embodiment of the present disclosure.

Post selecting the one or more standard operators, the selecting module 216, may determine a score for the one or more standard operators relevant to each of the one or more conditions of the predicate and each of the one or more actionable statements of the action segment, of the predicate-action pair. It must be understood that the score for the one or more standard operators may be determined based on degree of matching of the one or more keywords with one or more key markers of the one or more standard operators. The one or more standard operators may be displayed in decreasing order of the score of the one or more standard operators. The score may be indicative of significance of performing action accurately. FIG. 7 depicts selection of the one or more standard operators relevant to each of the one or more conditions of the predicate and relevant to each of the one or more actionable statements of the action segment, of the predicate-action pair and display of the one or more standard operators in decreasing order of the score.

Post determining the score for the one or more standard operators, the selecting module 216 may link a standard operator having a highest score with least one of, the one or more conditions of the predicate and the one or more actionable statements of the action segment, of the predicate-action pair. The selecting module may link a standard operator having a highest score, from the one or more standard operators, relevant to each of the one or more conditions and each of the one or more actionable statements, with each of the one or more conditions and each of the one or more actionable statements respectively. Thereby the selecting module may be converting the predicate-action pair in an actionable knowledge form. The actionable knowledge form may be reusable, and the actionable knowledge form may be converted to computer executable form The standard operator linked by the selecting module 216 with the actionable statement, may be the most appropriate standard operator to perform the actionable statement on fulfilling the condition present in the predicate. Similarly, the standard operators may be selected for each predicate-action pair by the selecting module 216.

For example, as shown in FIG. 7, 'StartService' is a standard operator selected by the selecting module in order to link with the predicate-action pair 'If the service is not started, attempt to start the service.

The predicate-action pairs may be further represented in form of a flow chart by the selecting module 216. The representation of the predicate-action pairs in the form of the flow chart may help user to understand execution of the one or more tasks associated with the operation.

In one embodiment, the predicate-action pairs may be termed as rules of the reusable actionable knowledge. The rules may comprise procedural knowledge present in the reusable actionable knowledge form. The procedural knowledge can be converted into the reusable actionable knowledge form by means of the rules. Table 4, illustrates few examples of the predicate-action pairs mapped with one or more standard operators, in accordance with an exemplary embodiment.

TABLE 4

Examples of predicate-action pairs mapped with one or more standard operators

| Sr. No. | Predicate | Action Segment mapped with standard operator |
|---|---|---|
| 1 | (Hostname exists) && (Username exists) | CheckHostname (${Hostname}) |
| 2 | CheckHostname:Return!=0 | Log(${Hostname} does not exist) |
| 3 | CheckHostname:Return=0 | CheckUserExistence(${Hostname}, ${Username}) |
| 4 | CheckUserExistence: Return=0 | Resetpassowrd((${Username}, ${Hostname},) |

Figure 8:
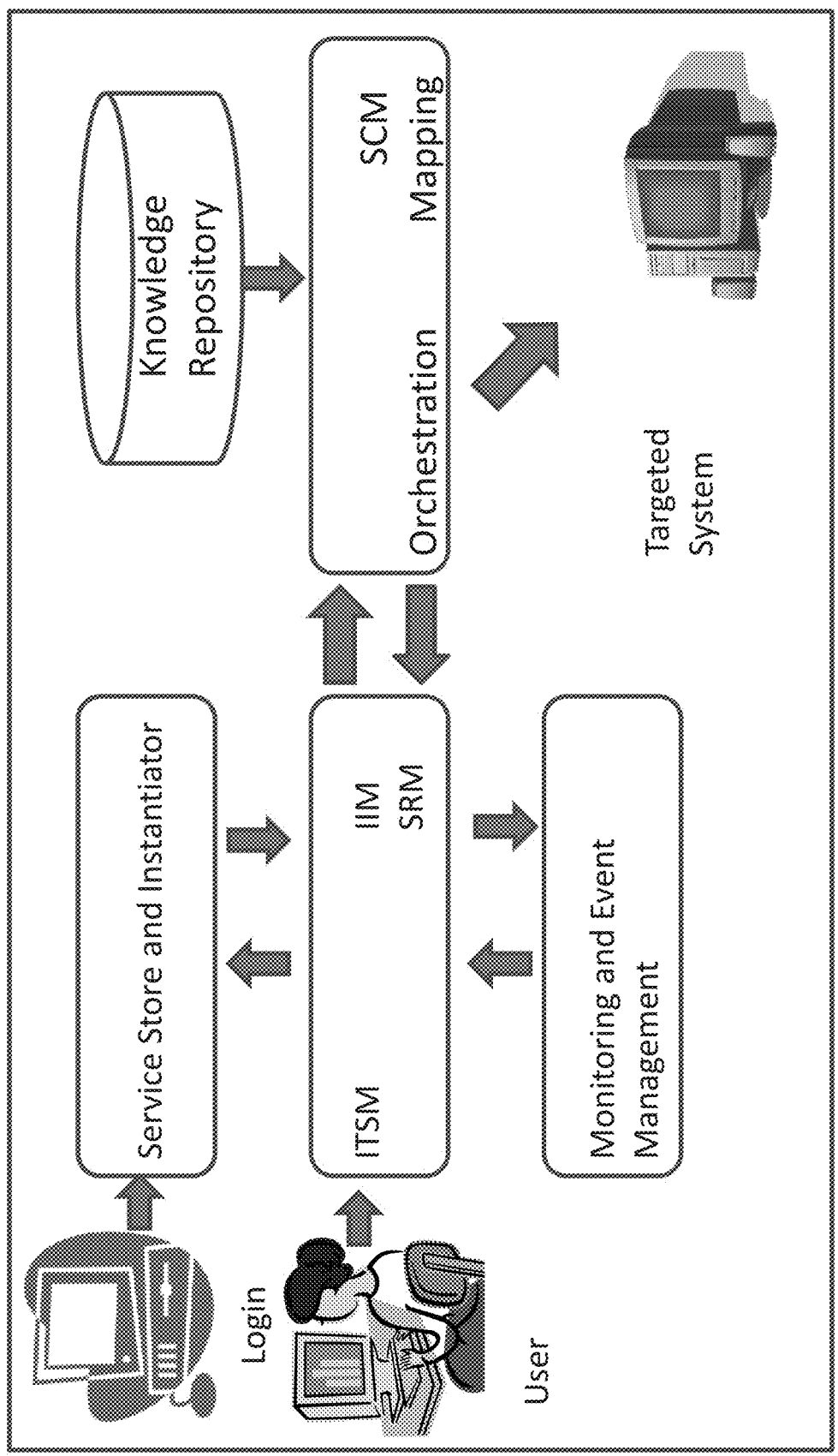
FIG. 8 illustrates overall system for acquisition, storage and utilization of an actionable knowledge form, in accordance with an embodiment of the present disclosure.

Referring to FIG. 8, overall system for acquisition, storage and utilization of knowledge is explained. The knowledge may be procedural knowledge. The procedural knowledge available in the documents such as run books, operating procedure documents, service documents, and service manuals may be converted into reusable actionable knowledge form by the system 102 and may be stored in the knowledge repository. The knowledge repository comprises the procedural knowledge in the form of the rules represented in predicate-action pairs. The 'Service Store and Instantiator' may be a web portal for user to login and select a service and initiate the execution. The IT Service Management module may consist of Incident Management (IM), Service Request Management (SRM), which may represent ticketing system in ITIS environment. Examples of well-known ITSM tool used are BMC Remedy™ and CCM.Net™. The issue/request instantiated via ITSM may be handled by the orchestrator. The orchestrator is a centralized control system governing workflow for requested service based upon the rules. The rules may be pre-defined.

According to an exemplary embodiment, the system 102 is tested on 5 run books for accuracy of procedural knowledge capture i.e. procedural text selection. The results of the test are shown in the Table 5. The rule based reasoning is used by the system 102 for finding the procedural text. The rule based reasoning is heuristics based approach and is improved using an active learning approach. Standard F-1 score is calculated to measure test's accuracy. F1-score is a harmonic mean of a recall (r) and a precision (p). F-1 score considers both precision (p) and the recall (r) of the test to compute the score, hence in F1 score both precision and recall is achieved at best value. The F1 score can be interpreted as a weighted harmonic mean of the precision and the recall, where the F1 score reaches its best score at 1 and worst score at 0.

In Table 5, TP stands for True Positive, FP stands for False Positive, FN stands for False Negative and TN stands for True Negative. In the table 5, 3 values (TP, FP, FN) are given which are relevant for calculation on the Precision and the Recall. Let N be total population size of results of procedural text detection experiment. N is divided explicitly into 4 parts TP, FP, FN and TN. Following equations are used to calculate F1 score.

$$TN=N-TP-FP-FN.$$

$$Precision=TP/(TP+FP)$$

$$Recall=TP/(TP+FN).$$

$$F1\text{-score}=2\times(Precision\times Recall)/(Precision+Recall))$$

TABLE 5

F1-scores for Procedural Text Detection

| Cases | TP | FP | FN | Precision | Recall | F1-Score |
|---|---|---|---|---|---|---|
| 1 | 37 | 5 | 12 | 0.8809 | 0.7551 | 0.8156 |
| 2 | 20 | 1 | 0 | 0.9524 | 1 | 0.9759 |
| 3 | 5 | 3 | 3 | 0.625 | 0.625 | 0.625 |
| 4 | 5 | 1 | 0 | 0.8333 | 1 | 0.9129 |
| 5 | 6 | 5 | 0 | 0.5455 | 1 | 0.7384 |
| Total | 69 | 15 | 15 | 0.8295 | 0.8295 | 0.8295 |

The exemplary embodiments discussed above may provide certain advantages. Though not required to practice aspects of the disclosure, these advantages may include those provided by the following features.

Some embodiments enable a system and a method to convert text contained in a document to a structured and an actionable knowledge form, wherein the text is used to perform a service operation.

Some embodiments enable the system and the method assist to resolve an issue associated with software services without human intervention or with minimum human intervention.

Some embodiments enable the system and the method to correlate natural language artifacts/content present in the document to actionable/automatable conditions and actions with almost no error.

Some embodiments enable the system and the method to identify actionable statements and conditions with reasonably low error.

Some embodiments enable the system and the method to automatically create rules representing reusable actionable knowledge form by mapping action segments with predicates to generate predicate-action pairs.

Some embodiments enable the system and the method to automatically convert predicate-action pair in an actionable knowledge form by linking a standard operator with the predicate-action pair.

Figure 9:
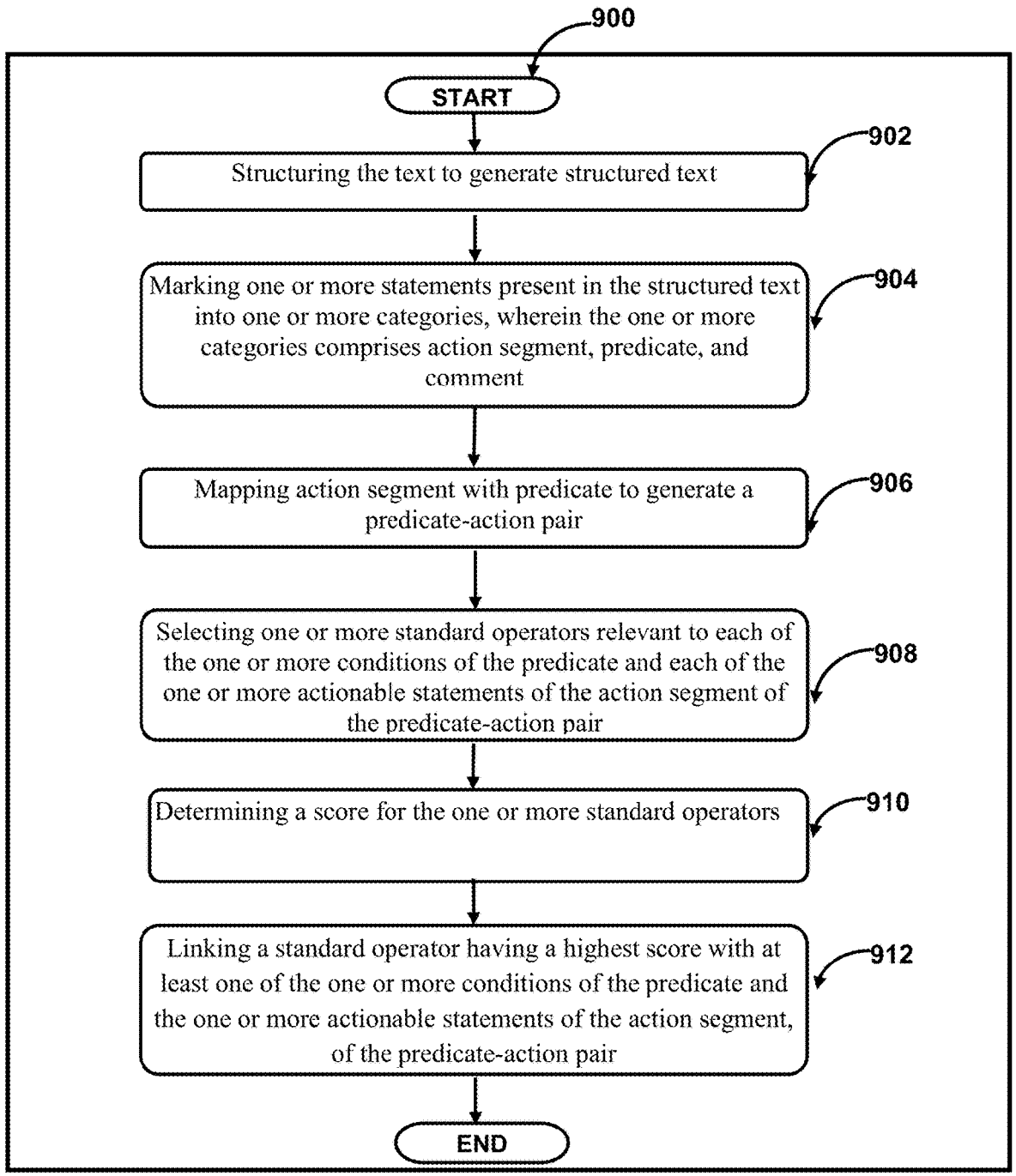
FIG. 9 illustrates a method for converting text contained in a document to an actionable knowledge form, in accordance with an embodiment of the present disclosure.

Referring now to FIG. 9, a method 900 for converting text contained in a document to an actionable knowledge form is shown, in accordance with an embodiment of the present disclosure. The text is used to perform an operation. The document may be one of an operating procedure document, a service document, a run book, a service manual. The document may be in a text form. The text may comprise procedural knowledge to perform the operation. The text may be in English Language The method 900 may be described in the general context of computer executable instructions. Generally, computer executable instructions can include routines, programs, objects, components, data structures, procedures, modules, functions, etc., that perform particular functions or implement particular abstract data types. The method 900 may also be practiced in a distributed computing environment where functions are performed by remote processing devices that are linked through a communications network. In a distributed computing environment, computer executable instructions may be located in both local and remote computer storage media, including memory storage devices.

The order in which the method 900 is described is not intended to be construed as a limitation, and any number of the described method blocks can be combined in any order to implement the method 900 or alternate methods. Additionally, individual blocks may be deleted from the method 1000 without departing from the spirit and scope of the disclosure described herein. Furthermore, the method can be implemented in any suitable hardware, software, firmware, or combination thereof. However, for ease of explanation, in the embodiments described below, the method 900 may be considered to be implemented in the above described system 102.

At block 902, the structuring of the text may comprise segmenting the text into independent textual blocks, and segmenting the textual blocks into statements by using a boundary detection technique. Further, at block 902, the text may be structured by performing at least one of merging, grouping, editing, or removing statements present in the text to generate structured text. In one implementation, the text may be structured by the structuring module 212 to generate the structured text.

At block 904, one or more statements present in the structured text may be marked into one or more categories. The one or more categories may comprise an action segment, a predicate, and a comment. The predicate may comprise one or more conditions. The action segment may comprise one or more actionable statements. The one or more actionable statements may be executed upon fulfilling of the one or more conditions. The one or more actionable statements may be used to perform one or more tasks during execution of the operation. In one implementation, the one or more statements present in the structured text may be marked by the structuring module 212 into the one or more categories. The one or more statements may be marked into the one or more categories by using a parsing technique and a rule based reasoning.

At block 906, the action segment may be mapped with the predicate to generate a predicate-action pair. In one implementation, the action segment may be mapped with the predicate by the mapping module 214 to generate the predicate-action pair. Similarly, a plurality of predicate-action pairs may be generated by mapping action segments with predicates present in the structured text.

At block 908, one or more standard operators relevant to the predicate-action pair may be selected. In one implementation, the one or more standard operators relevant to each of the one or more conditions of the predicate and each of the one or more actionable statements of the action segment, of the predicate-action pair may be selected by the selecting module 216. Further, the block 908 may be explained in greater detail in FIG. 10.

At block 910, a score for the one or more standard operators relevant to each of the one or more conditions of the predicate and each of the one or more actionable statements of the action segment, of the predicate-action pair may be determined. In one implementation, the score for the one or more standard operators may be determined by the selecting module 216. The score for the one or more standard operators may be determined based on degree of matching of the one or more keywords with one or more key markers of the one or more standard operators.

At block 912, a standard operator having a highest score may be linked with at least one of the one or more conditions of the predicate and the one or more actionable statements of the action segment, of the predicate-action pair. Thereby converting predicate-action pair in an actionable knowledge form. In one implementation, the standard operator having the highest score may be linked with at least one of the one or more conditions of the predicate and the one or more actionable statements of the action segment, of the predicate-action pair by the selecting module 216. Thus by linking the standard operator with the predicate-action pair, the predicate-action pair may be converted in an actionable knowledge form.

The actionable knowledge form may be reusable, and the actionable knowledge form may be converted to computer executable form. The method 900 further comprises linking a standard operator having a highest score, from the one or more standard operators relevant to each of the one or more conditions, with each of the one or more conditions. The method 900 further comprises linking a standard operator having a highest score from the one or more standard operators relevant to each of the one or more actionable statements, with each of the one or more actionable statements.

Figure 10:
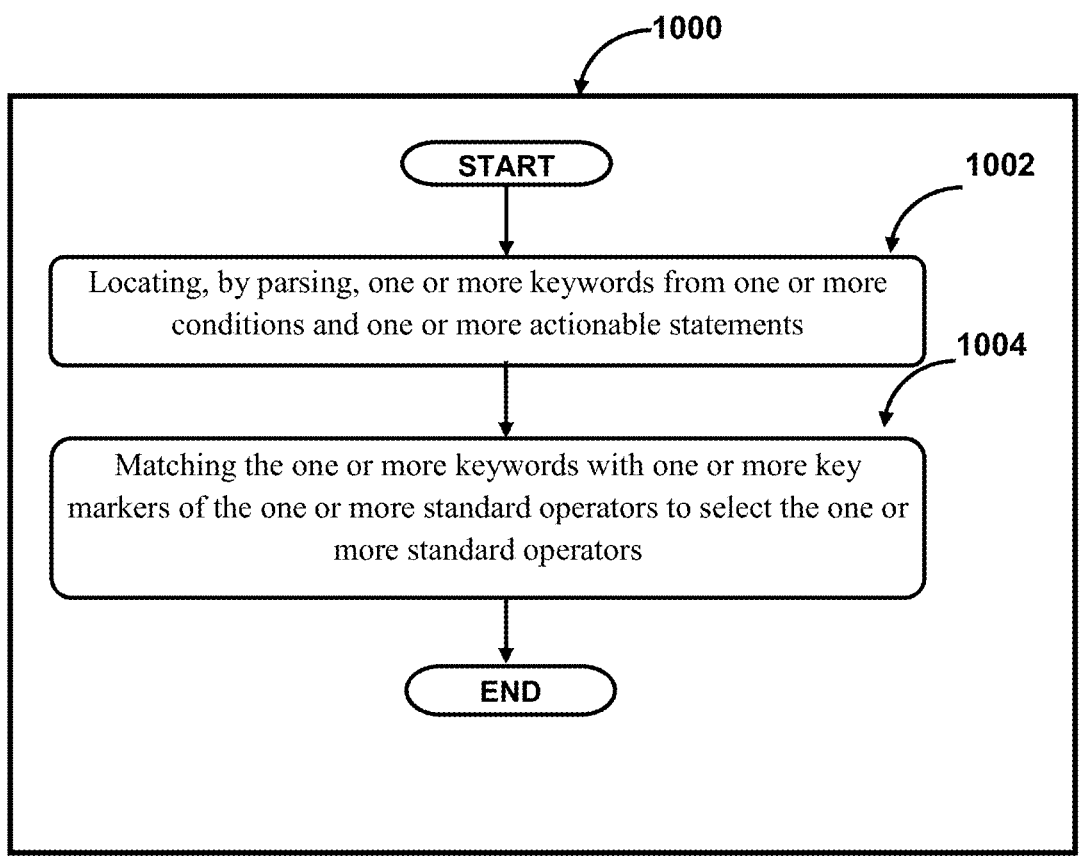
FIG. 10 illustrates a method for selecting one or more standard operators relevant to one or more conditions of a predicate and one or more actionable statements of an action segment, of a predicate-action pair, in accordance with an embodiment of the present disclosure.

Referring now to FIG. 10, the method 1000 (method step 908) for selecting the one or more standard operators relevant to the predicate-action pair is shown, in accordance with an embodiment of the present disclosure.

At block 1002, one or more keywords from one or more conditions and one or more actionable statements may be located by parsing the one or more conditions and the one or more actionable statements. In one implementation, the one or more keywords from the one or more conditions and the one or more actionable statements may be located by the selecting module 216, by parsing the one or more conditions and the one or more actionable statements.

At block 1004, the one or more keywords may be matched with one or more key markers of the one or more standard operators to select the one or more standard operators. In one implementation, the one or more keywords may be matched with the one or more key markers of the one or more standard operators by the selecting module 216 to select the one or more standard operators.

The method 900 may comprise executing a standard operator linked with the predicate-action pair for executing the one or more conditions and the one or more actionable statements associated with one or more task of the operation. The standard operator may be converted to computer executable form. The standard operator may be a predefined computer executable unit. The method 900 may comprise representing the predicate-action pairs in form of a flow chart.

Although implementations for methods and systems for converting text contained in a document to an actionable knowledge form have been described in language specific to structural features and/or methods, it is to be understood that the appended claims are not necessarily limited to the specific features or methods described. Rather, the specific features and methods are disclosed as examples of implementations for converting text contained in a document to an actionable knowledge form.

We claim:

1. A computer implemented method for converting text in a document to an actionable knowledge form, wherein the text is used to perform an operation, the method comprising:
    marking, by a processor, one or more statements present in structured text into one or more categories, wherein the one or more categories comprise an action segment, a predicate, and a comment, wherein the predicate comprises one or more conditions, and wherein the action segment comprises one or more actionable statements executed upon fulfilling the one or more conditions,
        wherein a boundary detection technique is implemented to identify at least one occurrence of a textual block from the text, and the textual block is segmented into one or more actionable statements, and wherein a parsing technique is generated to be applied on the one or more actionable statements to generate a parse tree and one or more junk statements are removed to construct the text into structured text;
    selecting, by the processor, one or more standard operators relevant to each of the one or more conditions of the predicate and each of the one or more actionable statements of the action segment, of a predicate-action pair, wherein each of the one or more standard operators are a predefined computer executable unit;
    determining, by the processor, a score for the one or more standard operators relevant to each of the one or more conditions of the predicate and each of the one or more actionable statements of the action segment, of the predicate-action pair, wherein the score is indicative of significance of performing actions associated with the predicate-action pair;
    generating, by the processor, the structured text by performing at least one of merging, grouping, editing and removing the one or more actionable statements based on the segmented textual block;
    marking, by the processor, the one or more actionable statements present in the structured text to perform one or more tasks during execution of the operation;
    converting automatically by the processor the predicate action pair to the actionable knowledge form and linking a standard operator having a highest score with at least one of the one or more conditions of the predicate and the one or more actionable statements of the action segment, of the predicate-action pair, for converting the predicate-action pair to a computer actionable form, by execution of the standard operator linked with the one or more conditions and the one or more actionable statements;
    creating, automatically, by the processor, one or more rules representing the actionable knowledge form in a reusable manner, wherein the one or more rules are created by mapping the action segment with the predicate to generate the predicate action pair; and
    performing, by the processor, a set union operation for a universal set of keywords on one or more key markers associated with the one or more standard operators, wherein the one or more standard operators are displayed in decreasing order of the score of the one or more standard operators, and wherein the score is indicative of accuracy of performing an action.

2. The method of claim 1, wherein the document is one of an operating procedure document, a service document, a run book, a service manual, and wherein the document is in a text form, and wherein the text comprises procedural knowledge to perform the operation, and the text is in the English Language.

3. The method of claim 1, wherein the one or more statements are marked into the one or more categories by using the parsing technique and a rule based reasoning.

4. The method of claim 1, wherein the selecting comprises:
    locating, by parsing, one or more keywords from the one or more conditions and the one or more actionable statements; and
    matching the one or more keywords with one or more key markers of the one or more standard operators to select the one or more standard operators.

5. The method of claim 4, wherein the score for the one or more standard operators is determined based on a degree of matching of the one or more keywords with the one or more key markers of the one or more standard operators.

6. A computer implemented system for converting text in a document to an actionable knowledge form, wherein the text is used to perform an operation, the system comprising:
    a processor; and
    a memory comprising a non-transitory computer readable storage medium coupled to the processor, wherein the processor is capable of executing a plurality of modules stored in the memory, and wherein the plurality of modules comprise:
        a structuring module for
            marking one or more statements present in structured text into one or more categories, wherein the one or more categories comprise an action segment, a predicate, and a comment, wherein the predicate comprises one or more conditions, and wherein the action segment comprises one or more actionable statements executed upon fulfilling the one or more conditions, and wherein the one or more actionable statements are used to perform one or more tasks during execution of the operation,
            wherein a boundary detection technique is implemented to identify at least one occurrence of a textual block from the text, and the textual block is segmented into one or more actionable statements, and wherein a parsing technique is generated to be applied on the one or more actionable statements to generate a parse tree and one or more junk statements are removed to construct the text into structured text;
        a mapping module for mapping the action segment with the predicate to generate a predicate-action pair; and a selecting module for
selecting one or more standard operators relevant to each of the one or more conditions of the predicate and each of the one or more actionable statements of the action segment, of the predicate-action pair, wherein each of the one or more standard operators are a predefined computer executable unit;

determining a score for the one or more standard operators relevant to each of the one or more conditions of the predicate and each of the one or more actionable statements of the action segment, of the predicate-action pair, wherein the score is indicative of significance of performing actions associated with the predicate-action pair;

generating the structured text by performing at least one of merging, grouping, editing and removing the one or more actionable statements based on the segmented textual block;

marking the one or more actionable statements present in the structured text to perform one or more tasks during execution of the operation;

automatically converting the predicate action pair to the actionable knowledge form and linking a standard operator having a highest score with at least one of the one or more conditions of the predicate and the one or more actionable statements of the action segment, of the predicate-action pair, for converting the predicate-action pair to an actionable form, by execution of the standard operator linked with the one or more conditions and the one or more actionable statements;

creating, automatically, by the processor, one or more rules representing the actionable knowledge form in a reusable manner, wherein the one or more rules are created by mapping the action segment with the predicate to generate the predicate action pair; and performing, by the processor, a set union operation for a universal set of keywords on one or more key markers associated with the one or more standard operators, wherein the one or more standard operators are displayed in decreasing order of the score of the one or more standard operators, and wherein the score is indicative of accuracy of performing an action.

7. The system of claim 6, wherein the document is one of an operating procedure document, a service document, a run book, a service manual, and wherein the document is in a text form, and wherein the text comprises procedural knowledge to perform the operation, and the text is in the English Language.

8. The system of claim 6, wherein the selecting module,
locates, by parsing, one or more keywords from the one or more conditions and the one or more actionable statements; and
matches the one or more keywords with one or more key markers of the one or more standard operators to select the one or more standard operators.

* * * * *